United States Patent
Cheng et al.

(10) Patent No.: US 7,149,747 B1
(45) Date of Patent: Dec. 12, 2006

(54) DYNAMIC GENERATION OF USER INTERFACE COMPONENTS

(75) Inventors: Kit Man Cheng, Oakland, CA (US); Issac Stephen Levin, Sunnyvale, CA (US); Wei-De Ju, Cupertino, CA (US)

(73) Assignee: Siebel Systems, Inc., San Mateo, CA (US)

( * ) Notice: Subject to any disclaimer, the term of this patent is extended or adjusted under 35 U.S.C. 154(b) by 454 days.

(21) Appl. No.: 10/180,987

(22) Filed: Jun. 27, 2002

(51) Int. Cl.
*G06F 17/30* (2006.01)
(52) U.S. Cl. ............... 707/102; 707/103 R; 707/104.1; 709/217; 715/517; 715/866; 719/316
(58) Field of Classification Search ............... 719/316, 719/318; 709/217; 707/103 R, 10, 102, 707/104.1, 100, 200; 715/517, 866
See application file for complete search history.

(56) References Cited

U.S. PATENT DOCUMENTS

| | | | |
|---|---|---|---|
| 5,877,766 A * | 3/1999 | Bates et al. | 715/854 |
| 6,072,490 A * | 6/2000 | Bates et al. | 715/821 |
| 6,243,088 B1 * | 6/2001 | McCormack et al. | 715/866 |
| 6,404,446 B1 * | 6/2002 | Bates et al. | 715/854 |
| 6,560,633 B1 * | 5/2003 | Roberts et al. | 709/202 |
| 6,792,607 B1 * | 9/2004 | Burd et al. | 719/316 |
| 6,853,391 B1 * | 2/2005 | Bates et al. | 715/854 |
| 2002/0033850 A1 * | 3/2002 | Bates et al. | 345/853 |

OTHER PUBLICATIONS

Unterweger, David et al., "Architecture Model for a User Interface Software Tool Supporting Application Independence", 1996 IEEE, pp. 205-212.*

* cited by examiner

*Primary Examiner*—Shahid Alam
(74) *Attorney, Agent, or Firm*—Campbell Stephenson Ascolese LLP

(57) ABSTRACT

The present invention provides a system and method for enabling the dynamic generation of user interface components. The dynamically-generated user interface components are based on templates and mappings that can be predefined through interaction with a user interface.

16 Claims, 6 Drawing Sheets

| POLICY SUMMARY | | |
|---|---|---|
| ADD CONTINUE ▽ △ 1 - 7 OF 7+ | | |
| POLICY NUMBER | POLICY TYPE | INSURED PERSON |
| 1-12W4H | AUTO QUOTE | PERSON A |
| 1-12ZZD | AUTO POLICY | PERSON B |
| 1-13000 | AUTO POLICY | PERSON C |
| 1-16A6X | AUTO POLICY | PERSON D |
| 1-16AF9 | AUTO POLICY | PERSON E |
| 1-8HL | AUTO QUOTE | PERSON F |
| 1-9U7U | | PERSON G |

DYNAMIC GENERATION OF USER INTERFACE COMPONENTS

BACKGROUND OF THE INVENTION

This invention relates generally to user interfaces, and more particularly to the dynamic generation of user interfaces.

Front office solutions increasingly include industry-specific functionality, enabling organizations to deploy applications tailored to the requirements of the industry. Modern front office solutions can empower sales, marketing, and customer service professionals with comprehensive information about customers, products, competitors, and markets. Companies that deploy these systems can develop and maintain a long-term competitive advantage through dramatic long-term improvements in sales productivity and customer satisfaction. These benefits provide a substantial positive economic value to the corporation. Companies that implement modern front office solutions view them not only as yielding positive net present value but also as an essential requirement for the survival of their enterprise.

In this environment, company-specific functionality is also critical to the success of the front office solutions. Company-specific functionality is often expressed in the defined business process (e.g., applying for a loan, requesting a quote, etc.). These business processes change frequently as a company adapts its workflows to conform to the "best practices" that have been defined. Adaptation of a company's business processes typically result in the modification of various user interface elements. Conventionally, these user-interface modifications require a recompilation and redeployment of the computer logic that governs the user interface elements. This recompilation and redeployment process is costly in both time and resources. What is needed therefore is a solution that can flexibly adapt to a customer's needs.

SUMMARY

The present invention provides a system and method for enabling the dynamic generation of user interface components. The dynamically-generated user interface components are based on templates and mappings that can be predefined through interaction with a user interface.

BRIEF DESCRIPTION OF THE DRAWINGS

FIG. 4 illustrates an embodiment of a list applet.

FIG. 5 illustrates an embodiment of a form applet.

DETAILED DESCRIPTION

An embodiment of the invention is discussed in detail below. While specific implementations of the invention are discussed, it should be understood that this is done for illustration purposes only. A person skilled in the relevant art will recognize that other components and configurations may be used without departing from the spirit and scope of the invention.

Customer relationship management (CRM) maximizes the value of a company's customer portfolio through more effective and efficient marketing, sales and customer service. The CRM framework enables a broad approach to doing business. It can be designed to encompass all aspects and functions of a company, focusing on managing the relationship between customer and company just as much as between company and customer.

CRM software reduces service costs and maximizes sales and marketing dollars by organizing a business around its customers. Handling rapidly changing data flows with accuracy and responding instantly to the varied needs of salespeople and service technicians can mean the difference between success and failure. For example, an enterprise can build a database about its customers that describes relationships in sufficient detail such that management, salespeople, and other team members can access information, match customer needs with product plans and offerings, and manage marketing campaigns with clear goals and objectives.

One example of an embodiment of CRM software is the Siebel 7 eBusiness Applications software by Siebel Systems, Inc. Siebel 7 eBusiness Applications software is a fully integrated suite of applications for CRM, wherein each application is based on a common Web architecture.

Figure 1:
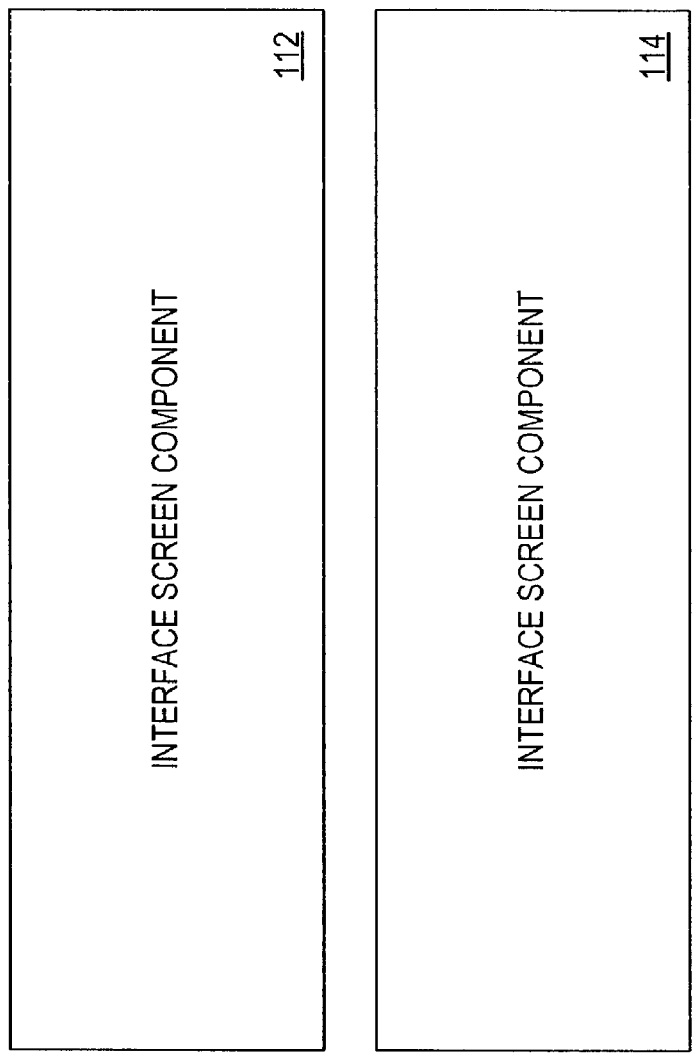
FIG. 1 illustrates a user interface framework.

CRM software is typically designed to provide a user interface that facilitates interaction with a user. A basic layout for a user interface is presented in FIG. 1, which illustrates a user interface screen 100 having interface screen components 112 and 114. While the particular structure and composition of interface screen components 112 and 114 can vary depending upon a particular user interface implementation, interface screen components 112 and 114 can be viewed as representing a particular frame of interaction for a user. These frames of interaction can enable the completion of particular functions in the context of a broader workflow process. For example, interface screen components 1112 and 114 can be embodied in a variety of forms, including a frame, a sub-window, a form, a list, or the like.

In the embodiment described below, the overall display of interface screen 100 is referred to as a view, while interface screen components 112 and 114 are referred to as applets. In general, an applet is a data entry form, composed of controls, that occupies some portions of the application interface. Here, it should be noted that the term app let as used herein broadly refers to a user interface component and is not limited to a fully functioning program that is created in the Java programming language.

An applet is typically associated with one business component (BusComp), which defines a logical entity that associates columns from one or more tables into a single structure. Applet objects manage the user interaction for customer-developed applications and components. These interactive visual components communicate with business objects (BusObjects) through an Applet Manager layer. The Applet Manager layer also extends programs by exposing the interfaces to its applet objects.

In general, the Applet Manager is responsible for rendering the application user interface and managing users' interactions. Applets are combined and displayed by the Applet Manager in views, which are accessible to users as screens within the applications. In general, a view is a collection of applets that appear at the same time on the same screen. A view can be thought as single window's worth of data forms (applets). An application window displays one view at one time.

The Applet Manager reads the view object definition from a data repository, determines the applets required for the view, then reads the applet object definitions. The Applet Manager then draws the associated controls (e.g., buttons, combo boxes, check boxes, labels, text fields, ActiveX controls) and images based on the object definitions. The Applet Manager renders the views, applets, and other objects on an on-demand basis. In this framework, a particular object, such as an Account View for example, is not rendered until the user navigates to that view.

More generally, the underlying purpose of the Applet Manager is to provide a framework for instantiating applets and to manage the applet/BusObject interaction. This applet/BusObject interaction can include the execution of the appropriate BusObjects methods requested by applets and other objects. BusObjects are described in greater detail below.

In accordance with the present invention, applets are generated dynamically during runtime. This dynamic applet generation is in contrast to conventional applet rendering methods. In a conventional system, applet generation relies on the retrieval of pre-compiled applet information that are stored in the data repository. As would be appreciated, pre-compiled applet information place significant limitations on the implementation of user-interface modifications. If user-interface modifications are required, a recompilation of the applets would typically occur using an application development environment, such as Siebel Tools, that can be based on a set of programming tools such as Microsoft Visual C++ and Visual Basic. The recompiled applet is then redeployed into the application environment. This process requires significant time and effort and limits the flexibility in the customization of the application software.

In contrast, dynamic applets obviate the need for continual transitions between the application environment and the development environment. Dynamic applets can be based on predefined applet templates that are stored for subsequent runtime retrieval from the data repository. An application administrator, such as a business analyst responsible for mapping customer business requirements to project implementations, can use a predefined applet template to establish an unlimited number of app let instances that are to be generated during runtime.

Figure 2:
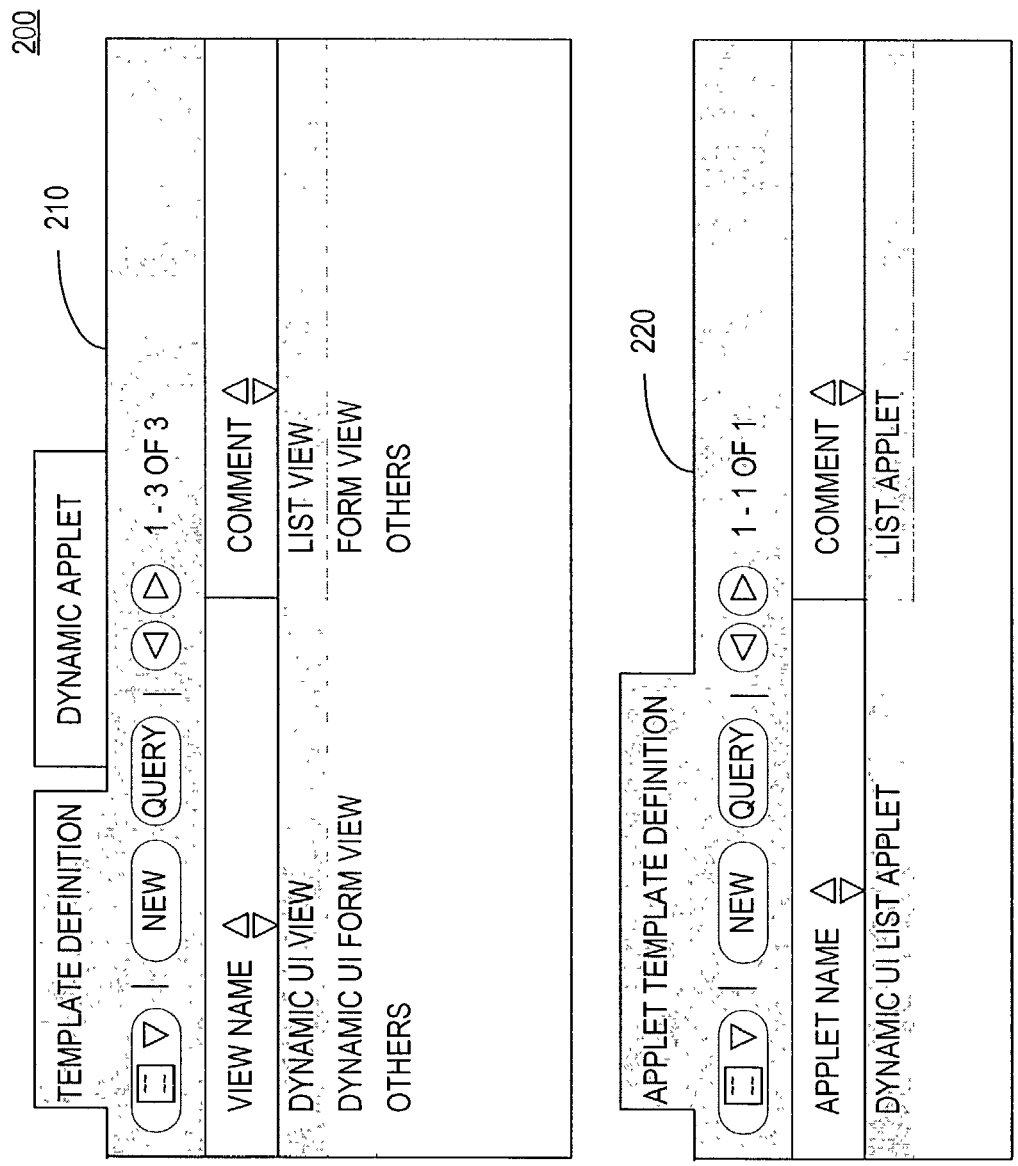
FIG. 2 illustrates an embodiment of a template definition view.
Figure 3:
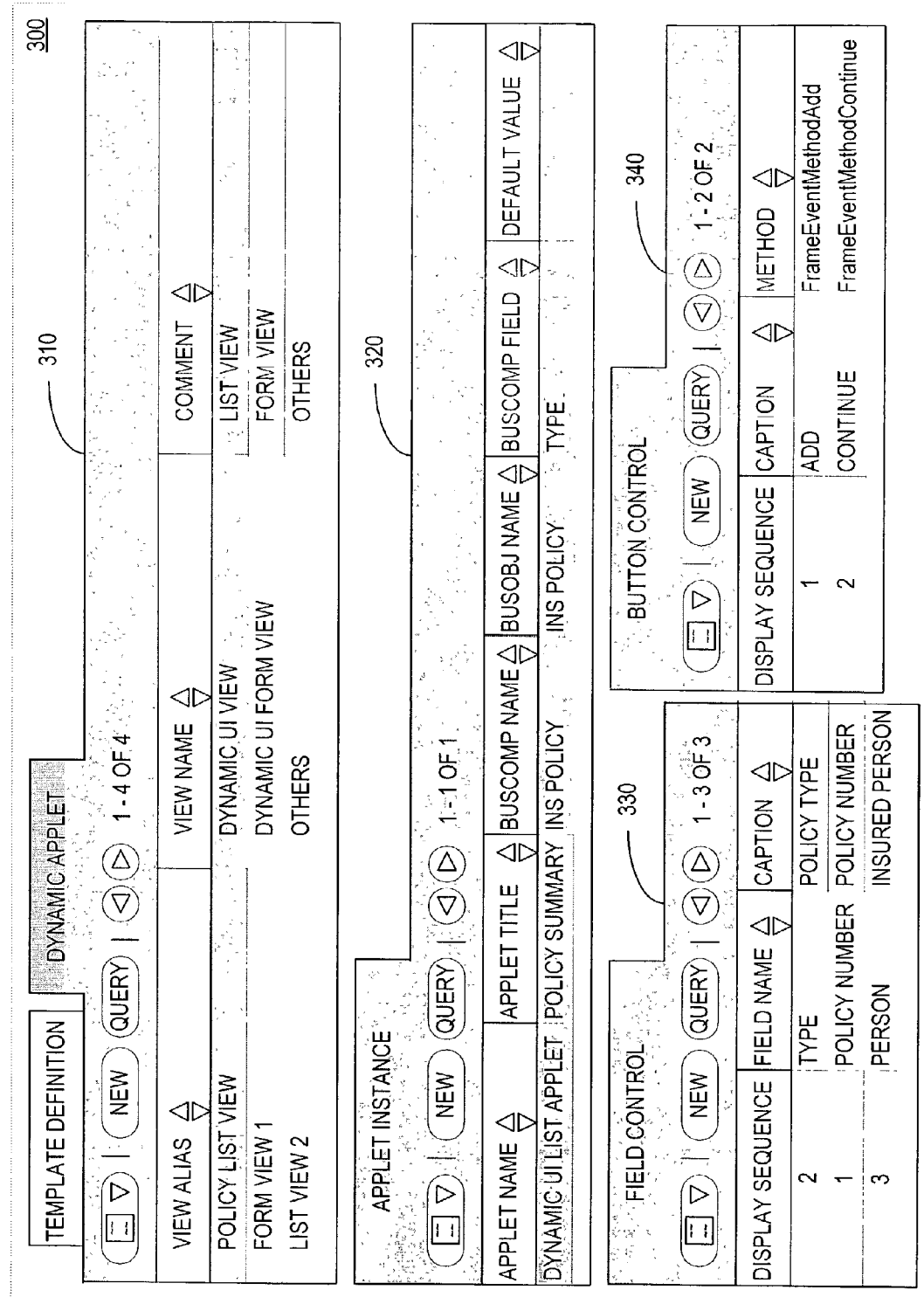
FIG. 3 illustrates an embodiment of a dynamic applet view.

In one embodiment, a dynamic applet can be defined through the example user interfaces of FIGS. 2 and 3. FIG. 2 illustrates template definition administration view 200. In the illustrated embodiment, template definition administration view 200 includes view list applet 210 and applet list applet 220.

View list applet 210 includes the view template placeholder (i.e., view name) that has been predefined for dynamic applet use in the application development environment and compiled into a repository file. As illustrated in the example of FIG. 2, view list applet 210 includes the two view template placeholders, "Dynamic UI View," which defines a list view template, and "Dynamic UI Form View," which defines a form view template. As would be appreciated, the number and type of view template placeholders that can be defined is implementation dependent.

Similarly, applet list applet 220 includes the applet template placeholder (i.e., applet name) that has been predefined in the application development environment and complied into the repository file. As illustrated in the example of FIG. 2, view list applet 210 includes the applet template placeholder, "Dynamic UI List Applet," which defines a list applet template.

In general, the predefined templates have mapped placeholder fields that are used for mapping to the fields and BusComps that are specified by the user. This mapping can be defined by the user using the example user interface illustrated in FIG. 3 and stored in the data repository. The user interface embodiment of FIG. 3 includes dynamic applet administration view 300. As illustrated, dynamic applet administration view 300 further includes view instance list applet 310, applet instance list applet 320, field definition list applet 330 and button definition list applet 340.

View instance list applet 310 enables a user to define which view template to use. As noted above, a set of predefined view templates can be provided to the user through the listing in view list applet 210 of template definition administration view 200. In the definition process, the user would define a View Alias and View Name pair for each view instance. Here, View Alias is a unique entry that identifies an instance of the selected view template.

Once a View Name is picked, the View Alias is defined, and the record is saved, applet instance list applet 320 will then create a new record and automatically populate the record with the app let name that is defined in applet list app let 220 of template definition administration view 200. In the example of FIG. 3, the defined applet instance has an applet name of "Dynamic UI List Applet."

In addition to the provision of the applet name, applet instance list applet 320 also enables a user to define the BusComp name and BusObject name for the data that the target dynamic view will populate.

In general, BusObjects are highly customizable, object-oriented building blocks. The BusObjects implement a business model, tying together a set of interrelated BusComps using links. The set of relationships established in a BusObject provides the foundation for views, wherein every view has a BusObject assigned to it. The family of BusObjects is extensive and can include Opportunity, Account, Customer, Product, Competitor, Campaign, Service Request, and Product Defect. BusObjects also include the business logic for the BusComp objects.

BusObjects group one or more BusComps into a logical unit of information. For example, an Opportunity BusObject may consist of an Opportunity, Contact, and Product BusComp, wherein the Opportunity BusComp dictates the information of the other BusComps (parent-child relationships). A BusObject Manager can be designed to provide for consistent object behavior and interaction of all BusObjects within the enterprise applications.

As noted, a BusComp defines a logical entity that associates columns from one or more tables into a single structure. BusComps therefore provide a layer of wrapping over tables. In this framework, applets can reference the BusComps rather than the underlying tables in the repository. This design creates a greater level of convenience since all associated columns are together in one bundle. This design also enables developer-friendly naming, and the isolation of the developer role from the system administrator role. A BusComp not only encapsulates data but also enables the developer to define the behavior of the entity.

As further illustrated in FIG. 3, applet instance list applet 320 also enables a user to specify values of a BusComp Field and a Default Value field. Here, the BusComp Field is the field that the user wants the search specification to be based on, while the Default Value field specifies the value for the BusComp search specification. The value specified in the Default Value field is designed to be overridden if the workflow passes in a search specification through a business service step.

Field definition applet 330 enables a user to define a plurality of fields that are to be displayed in the target applet.

In one embodiment, the user is permitted to define a maximum of 20 fields. As noted, these display fields are represented as the placeholder fields that have been predefined in the applet template. For each display field, the user can then define respective display sequence, BusComp field, and field caption information.

In particular, the Field Name field will display the field that exists in the BusComp specified for the applet instance that was defined in applet instance list applet 320. For example, in the illustration of FIG. 3, the user has selected the "Type," "Policy Number," and "Person" fields that are defined for the "Ins Policy" BusComp of the "Dynamic UI List Applet."

For each field that is selected, the user also specifies a display sequence. Here, the Display Sequence field will enable the user to specify a number input so that the target dynamic view applet will display the field column, for example, in the ascending order from left to right for a list applet, and left to right, top to bottom for a form applet. Finally, the Caption field enables the user to specify the display value for the fields in the target dynamic view applet.

Next, button definition applet 340 enables a user to define the set of one or more buttons to be displayed in the target dynamic view applet. In button definition applet 340, the Display Sequence and Caption fields can be used in the same way as described above with reference to field definition applet 330. In addition to the Display Sequence and Caption fields, the user can also specify values for the Method field. These values identify the method names that the target buttons will invoke during runtime selection. In the illustrated embodiment of FIG. 3, the "Add" button will invoke the "FrameEventMethodAdd" method, while the "Continue" button will invoke the "FrameEventMethodContinue" method. The "FrameEventMethodAdd" and "FrameEventMethodContinue" methods represent one set of examples of methods that can be invoked by a button in the context of a workflow.

In combination, the information specified in applet instance list applet 320, field definition list applet 330 and button definition list applet 340 defines a mapping between an applet template and a particular BusComp/BusObject. This mapping information is stored in the data repository and retrieved during runtime to effect a dynamic generation of a specified app let.

FIG. 4 illustrates an embodiment of a resulting list applet that can be generated using the mapping information specified in FIG. 3. In this embodiment, Policy Summary applet 400 includes the three columns, "Policy Number," "Policy Type," and "Insured Person" that have been defined in field definition list applet 330. Policy Summary applet 400 also includes the two buttons "Add" and "Continue" that have been defined in button definition list applet 340.

Figure 5:
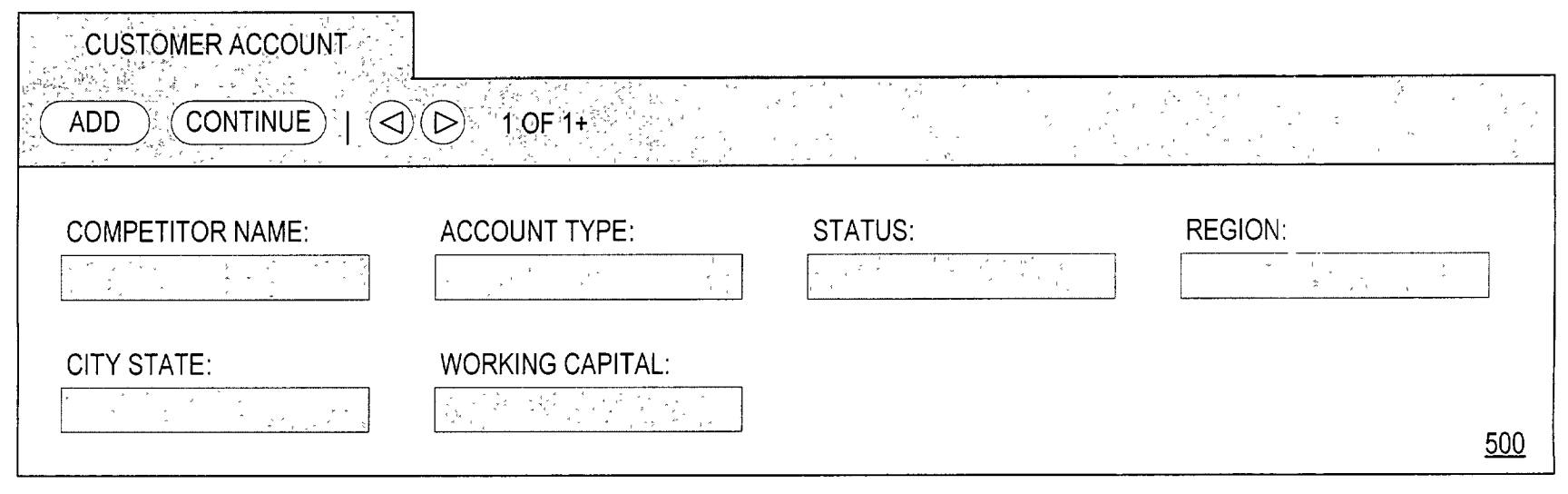

As noted above, a form applet can also be defined using dynamic applet administration view 300. An example of a dynamically generated form applet is illustrated in FIG. 5. This Customer Account form applet 500 includes the input fields Competitor Name, Account Type, Status, Region, City State, and Working Capital along with buttons "Add" and "Continue." These fields and buttons can be defined in dynamic applet administration view 300 in a manner similar to the definition of Policy Summary list applet 400.

Having described an example process of defining dynamic applets through administration views 200 and 300, the runtime process of generating a dynamic applet is now described. In general, the dynamic applet generation process can be invoked in various ways, including an invocation through a workflow or through a direct invocation.

In one embodiment, a direct invocation can be effected through a go-to-view process, which can be launched by a user upon selection of a particular view name from a set of available views. For example, when a user goes to the View menu, Site Map->Dynamic Applet, the user will see "Dynamic UI View" or "Dynamic UI Form View." Clicking on the Dynamic UT View link will bring up the target Dynamic UI List View while clicking on the Dynamic UI Form View link will bring up the target Dynamic UT Form View.

Workflows, on the other hand, can invoke a dynamic applet as part of a process defined for a product application. For example, in a checkout process a customer agent could be directed by a SmartScript interface. In general, SmartScript is an intuitive scripting tool that can guide an agent through an entire customer interaction, dynamically suggesting the right products and services based on various considerations including the customer's profile, unique environment, current requirements, and buying patterns. By guiding agents through a scripted conversation flow, SmartScript helps the agent diagnose problems and follow correct workflow processes for consistent results with each customer. By following a complete call script tailored to the customer's needs, agents can ask the right questions at the night time, produce higher quality interactions, eliminate data-entry errors, and maximize the opportunity for selling additional products or services that can augment the customer's existing purchases.

In one embodiment, SmartScript can be designed to invoke a workflow process, which in turn is able to invoke a dynamic app let. In the creation of a workflow process, the user can decide to override the default value that has been defined in applet instance list applet 320. If the user wants to override the default value that has been defined for an applet instance, the user can create a business service step (Pass in Object ID), with input arguments such as that embodied in the following example:

| Business Service: Dynamic UI Service Method: Add Record | | |
|---|---|---|
| Input Argument | Type | Value |
| BusComp Field | Literal | Id |
| BusComp Name | Literal | INS Policy |
| Object Id | Literal | 1-8E6U (or current object Id) |

Next, the user should create a business service step (View Alias), that refers to the unique view alias that the user wants the target dynamic applet view to display. The format of the business service step can be embodied such as that illustrated in the following example:

| Business Service: Dynamic UI Service Method: Set View Name | | |
|---|---|---|
| Input Argument | Type | Value |
| View Alias | Literal | Form View |

Figure 6:
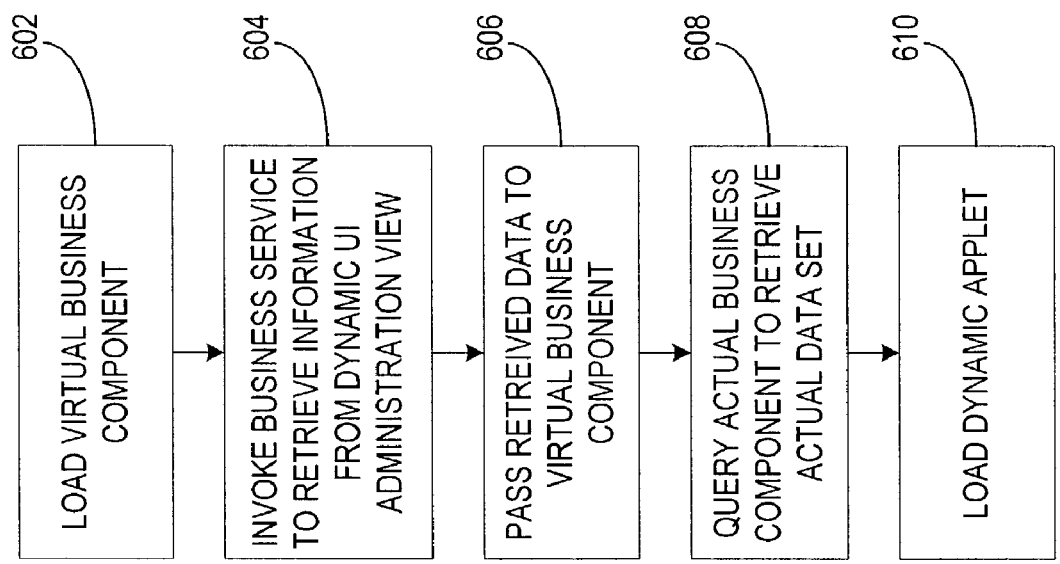
FIG. 6 illustrates a flowchart of the runtime generation of a dynamic applet.

Once the dynamic applet generation process is invoked either by workflow or directly, the dynamic applet is loaded during runtime through a process such as that illustrated in FIG. 6. The process of FIG. 6 begins at step 602, where a virtual business component (VBC) is loaded. Unlike a BusComp, VBCs need not correspond to a particular table column on a database. Rather, in one embodiment of the present invention, the VBC can be designed to call a business service to obtain data from a BusComp.

More specifically, at step 604, the VBC invokes a business service to retrieve the BusComp and BusObject information from dynamic UI administration view 300. Next, at step 606, the business service passes the BusComp and BusObject information to the VBC. Upon receipt of this data, the VBC can then query the identified BusComp to retrieve the actual data set at step 608. Finally, at step 610, the dynamic app let is loaded using the retrieved BusComp information. In particular, the fields in the template are populated with the retrieved BusComp information based on the mapping information defined in dynamic applet administration view 300.

As thus described, this dynamic applet generation process does not rely on the retrieval of pre-defined/pre-mapped applet information that are stored in the data repository. Rather, the dynamic generation of app lets is based on templates and mappings that can be predefined through interaction with template definition administration view 200 and dynamic applet administration view 300. This feature enables an application administrator to establish hundreds of app let instances without requiring recompilation and redeployment of individual applets. Significant flexibility in the customized design and implementation of a workflow process is thereby achieved.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for dynamically generating a user interface component, comprising:
    retrieving a user interface template that defines at least part of a layout of fields of at least one user interface component and one or more button controls in said at least one user interface component;
    retrieving at least one mapping between a plurality of fields in said user interface template and respective plurality of columns in one or more tables in a database, the at least one mapping further associating the one or more button controls with methods to be invoked by the button controls; and
    rendering the at least one user interface component in accordance with said retrieved user interface template and said corresponding retrieved at least one mapping, each of said rendered at least one user interface component including a field that is associated with a particular column of the database in accordance with said corresponding retrieved at least one mapping.

2. The method of claim 1, wherein said user interface component comprises an applet.

3. The method of claim 1, wherein said at least one mapping identifies a business component.

4. The method of claim 3, wherein said at least one mapping identifies a field of the business component.

5. The method of claim 1, wherein said at least one mapping identifies a plurality of business component.

6. The method of claim 4, wherein said at least one mapping identifies a display sequence of a plurality of fields of said business component.

7. The method of claim 1, wherein said at least one mapping identifies a caption for a display field.

8. The method of claim 1, wherein said at least one user interface component is a form.

9. The method of claim 1, wherein said at least one user interface component comprises a list.

10. A computer program product comprising:
    computer-readable program code for causing a compute to retrieve a user interface template that defines at least part of the layout of fields of a user interface component and one or more button controls in said user interface component;
    computer-readable program code for causing a computer to retrieve a plurality of mappings between a plurality of fields in said user interface template and a respective plurality of columns in one or more tables in a database, the plurality of mappings further associating the one or more button controls with methods to be invoked by the button controls;
    computer-readable program code for causing a computer to render a plurality of user interface components in accordance with said retrieved user interface template and said corresponding retrieved mappings, each of said plurality of rendered user interface components including a field that is associated with a particular column of a database in accordance with each of said retrieved plurality of mappings; and
    a computer-usable medium configured to store the computer-readable program codes.

11. A machine-readable medium containing instructions which, when executed by a processing system, cause the processing system to perform a method, the method comprising:
    retrieving a user interface template that defines at least part of a layout of fields of at least one user interface component and one or more button controls in said at least one user interface component;
    retrieving at least one mapping between a plurality of fields in said user interface template and respective plurality of columns in one or more tables in a database, the at least one mapping further associating the one or more button controls with methods to be invoked by the button controls; and
    rendering the at least one user interface component in accordance with said retrieved user interface template and said corresponding retrieved at least one mapping, each of said rendered at least one user interface component including a field that is associated with a particular column of the database in accordance with said corresponding retrieved at least one mapping.

12. The machine-readable medium of claim 11, wherein said at least one user interface component comprises an applet.

13. The machine-readable medium of claim 11, wherein said at least one mapping identifies at least one of a business component, a field of the business component, a plurality of business components, a display sequence of a plurality of fields of the business component, and a caption for a display field.

14. A system comprising:
    a data repository to store a user interface template, which defines at least part of a layout of fields of at least one user interface component and one or more button controls in said at least one user interface component, and at least one mapping between a plurality of fields in said user interface template and respective plurality of columns in one or more tables in a database, the at least one mapping further associating the one or more button controls with methods to be invoked by the button controls; and an applet manager to retrieve the user interface template, to retrieve the at least one mapping between the plurality of fields in said user interface template and the respective plurality of columns in one or more tables in the database, and to render the at least one user interface component in accordance with said retrieved user interface template and said corresponding retrieved at least one mapping, each of said rendered at least one user interface component including a field that is associated with a particular column of the database in accordance with said corresponding retrieved at least one mapping.

15. The system of claim 14, wherein said at least one user interface component comprises an applet.

16. The system of claim 14, wherein said at least one mapping identifies at least one of a business component, a field of the business component, a plurality of business components, a display sequence of a plurality of fields of said business component, and a caption for a display field.

* * * * *